United States Patent
Kurata et al.

(10) Patent No.: US 9,334,953 B2
(45) Date of Patent: May 10, 2016

(54) CONTROL APPARATUS FOR VEHICLE POWER TRANSMISSION MECHANISM

(71) Applicant: HONDA MOTOR CO., LTD., Tokyo (JP)

(72) Inventors: Takeshi Kurata, Wako (JP); Akihira Aoki, Wako (JP); Keiji Tojo, Wako (JP); Isao Tabushi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 14/363,855

(22) PCT Filed: Mar. 12, 2013

(86) PCT No.: PCT/JP2013/056725
§ 371 (c)(1),
(2) Date: Jun. 9, 2014

(87) PCT Pub. No.: WO2013/141069
PCT Pub. Date: Sep. 26, 2013

(65) Prior Publication Data
US 2014/0303863 A1  Oct. 9, 2014

(30) Foreign Application Priority Data
Mar. 19, 2012 (JP) ................................. 2012-062588

(51) Int. Cl.
| F16D 48/06 | (2006.01) |
| F16H 61/14 | (2006.01) |
| F16H 59/46 | (2006.01) |
| F16H 57/00 | (2012.01) |

(52) U.S. Cl.
CPC .............. *F16H 61/143* (2013.01); *F16D 48/06* (2013.01); *F16D 2500/30428* (2013.01); *F16D 2500/50293* (2013.01); *F16H 2057/0012* (2013.01); *F16H 2059/465* (2013.01); *F16H 2061/145* (2013.01)

(58) Field of Classification Search
CPC ............................................ F16D 2500/30428
See application file for complete search history.

(56) References Cited

U.S. PATENT DOCUMENTS 7,228,216 B2 *  6/2007  Inoue .................. F16H 61/0437
                                                    192/48.2
2008/0070750 A1 *  3/2008  Eguchi ..................... F16H 61/12
                                                    477/120

FOREIGN PATENT DOCUMENTS

| JP | 61-052427 A | 3/1986 |
| JP | 03-121322 A | 5/1991 |

(Continued)

OTHER PUBLICATIONS

International Search Report dated Jun. 11, 2013 corresponding to International Patent Application No. PCT/JP2013/056725 and English translation thereof.

*Primary Examiner* — Erin D Bishop
(74) *Attorney, Agent, or Firm* — Squire Patton Boggs (US) LLP

(57) ABSTRACT

In a control apparatus for a vehicle power transmission mechanism (automatic transmission) having a transmission equipped with at least an input shaft connected to a drive source mounted on a vehicle, an output shaft connected to the input shaft via a speed ratio change mechanism, and a clutch (start clutch) which transmits a rotation of the output shaft to driven wheels and whose engaging force is regulated, a clutch output rotation change rate is calculated, and the clutch engaging force is corrected to decrease when the calculated output rotation change rate is a positive value, and the clutch engaging force is corrected to increase when the calculated output rotation change rate is a negative value, thereby enabling to suppress clutch juddering occurred due to a difference between input and output rotational speeds of the clutch.

20 Claims, 6 Drawing Sheets

(56) References Cited

FOREIGN PATENT DOCUMENTS

| JP | 04-171323 A | 6/1992 |
| JP | 2001-241545 A | 9/2001 |
| JP | 3518648 B2 | 4/2004 |
| JP | 2004-278769 A | 10/2004 |

* cited by examiner

CONTROL APPARATUS FOR VEHICLE POWER TRANSMISSION MECHANISM

TECHNICAL FIELD

This invention relates to a control apparatus for a vehicle power transmission mechanism, particularly to an apparatus for suppressing juddering of a clutch in a vehicle power transmission mechanism.

BACKGROUND ART

In a vehicle equipped with a power transmission mechanism having an automatic transmission having an input shaft coupled to a drive source mounted on the vehicle and an output shaft connected to the input shaft via a hydraulic clutch, juddering of the clutch of the automatic transmission may occur due to the difference between input and output rotational speeds, rendering the vehicle occupant to have uncomfortable feeling. The juddering becomes remarkable as the deterioration of the clutch progresses.

It has hitherto been proposed by Patent Reference 1 to suppress juddering in a power transmission mechanism equipped with a torque converter, if the juddering of a lockup clutch is detected when a slip amount of the lockup clutch is controlled to a desired value, by correcting the desired slip amount to increase.

PRIOR ART REFERENCE

Patent Reference

Patent Reference 1: Japanese Patent 3518648.

SUMMARY OF INVENTION

Problems to be Solved by the Invention

In the technique disclosed in Patent Reference 1, as the clutch is the lockup clutch of the torque converter, no problem will arise if the slip amount is increased to suppress the juddering. However, when the clutch is one for connecting an input shaft coupled to a drive source with an output shaft to transmit power between the shafts, mere increase of the slip amount could invite power shortage.

The object of this invention is therefore to overcome this problem by providing a control apparatus for a vehicle power transmission mechanism that suppresses juddering occurred due to a difference between input and output rotational speeds of a clutch.

Means for Solving the Problems

According to an aspect of the invention, an apparatus for controlling a vehicle power transmission mechanism having a drive source mounted on a vehicle, a transmission equipped with at least an input shaft connected to the drive source, an output shaft connected to the input shaft via a speed ratio changing mechanism, and a clutch transmitting a rotation of the output shaft to driven wheels, and a clutch engaging force regulator that regulates engaging force of the clutch of the transmission, the vehicle power transmission mechanism being adapted to transmit driving force outputted from the drive source to the driven wheels through the input shaft, the output shaft, and the clutch whose engaging force is regulated by the clutch engaging force regulator, includes: a clutch output rotation change rate calculator that calculates an output rotation change rate of the clutch based on a differential value of a rotational speed of a clutch output shaft; and a clutch engaging force corrector that corrects the clutch engaging force regulated by the clutch engaging force regulator to decrease when the calculated output rotation change rate of the clutch is a positive value, and corrects the clutch engaging force to increase when the calculated output rotation change rate of the clutch is a negative value.

According to another aspect of the invention, the clutch engaging force corrector increases an amount of the decrease correction or increase correction of the clutch engaging force as an absolute value of the calculated output rotation change rate of the clutch increases.

According to another aspect of the invention, the clutch engaging force corrector suspends the decrease correction or increase correction of the clutch engaging force until a first predetermined time period elapses since the calculated output rotation change rate of the clutch inverted from the positive value to the negative value or from the negative value to the positive value.

According to another aspect of the invention, the clutch engaging force corrector corrects the clutch engaging force through an operating oil to be supplied to the clutch, and suspends the decrease correction or increase correction of the clutch engaging force after a second predetermined time period that is set to be longer than the first predetermined time period has elapsed since the calculated output rotation change rate of the clutch inverted from the positive value to the negative value or from the negative value to the positive value.

According to another aspect of the invention, the clutch engaging force corrector includes: a rotation change rate range discriminator that discriminates whether the calculated output rotation change rate of the clutch is within a predetermined range; and suspends the decrease correction or increase correction of the clutch engaging force when it is discriminated by the rotational change rate range discriminator that the calculated output rotation change rate of the clutch is within the predetermined range.

According to another aspect of the invention, the clutch engaging force corrector corrects the clutch engaging force through the operating oil to be supplied to the clutch, and the predetermined range is varied in accordance with at least a temperature of the operating oil to be supplied to the clutch.

According to another aspect of the invention, the clutch engaging force corrector calculates an amount of the decrease correction or increase correction of the clutch engaging force by multiplying the calculated output rotation change rate by a gain.

Effects of the Invention

According to the invention, it becomes possible to detect juddering of a clutch from a clutch output rotation change rate, and to maintain a difference in input and output rotational speeds of the clutch to a proper value, thereby enabling to suppress the juddering of the clutch effectively.

DESCRIPTION OF EMBODIMENT

An embodiment for carrying out a control apparatus for a vehicle power transmission mechanism according to the invention will now be explained with reference to the attached drawings.

Embodiment

Figure 1:
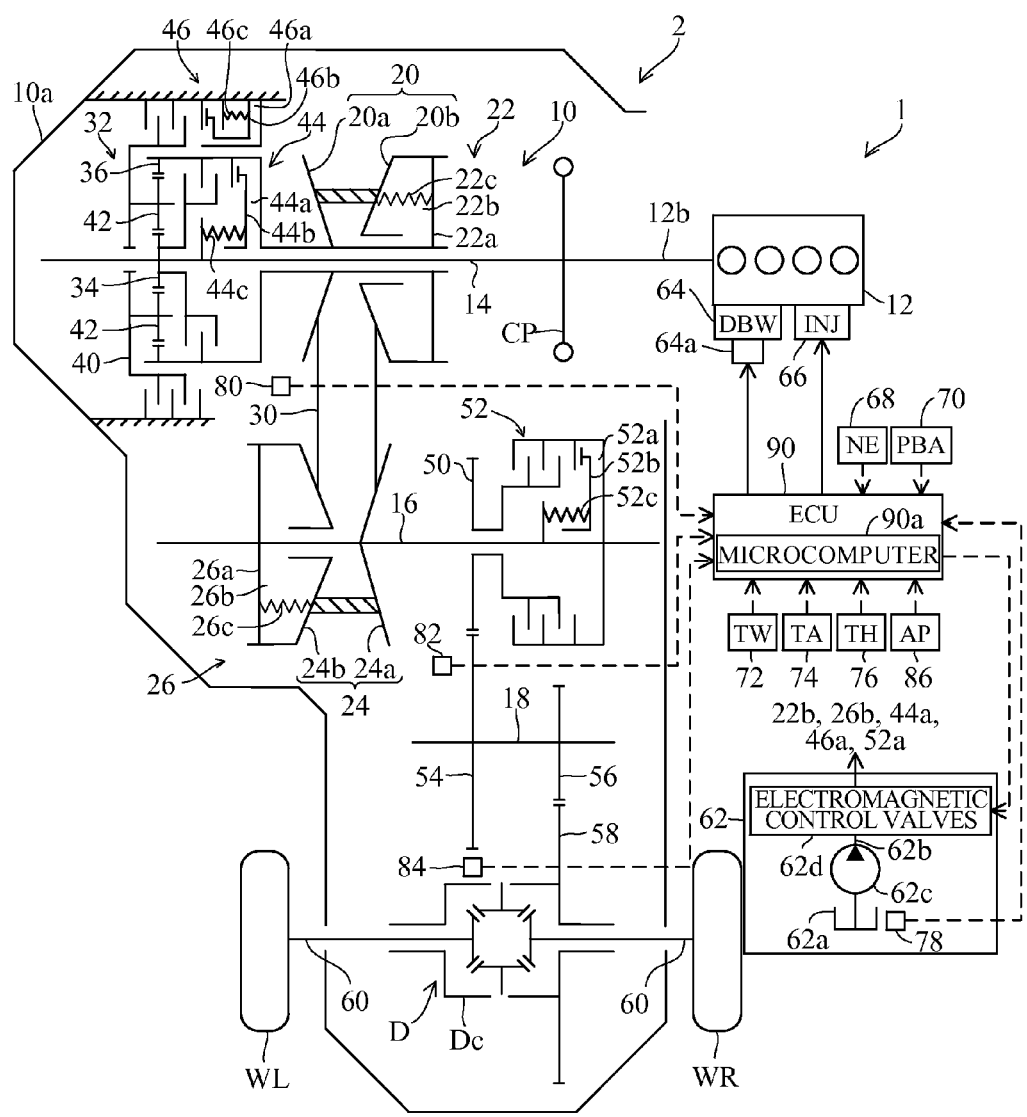
FIG. 1 is an overall view schematically showing a control apparatus for a vehicle power transmission mechanism according to this invention.

FIG. 1 is an overall view schematically showing a control apparatus for a vehicle power transmission mechanism according to this embodiment.

In FIG. 1, symbol 1 indicates a vehicle, and a power transmission mechanism 2 is mounted on the vehicle 1. The power transmission mechanism 2 has an automatic transmission, more specifically a Continuously Variable Transmission (CVT; hereinafter called "CVT") 10, etc. The CVT 10 changes the output of an engine (drive source) 12 in speed and transmit it to left and right driven wheels (front wheels) WL, WR through a differential mechanism D. The engine 12 comprises, for example, a spark-ignited gasoline engine having four cylinders.

The CVT 10 has an input shaft 14, output shaft 16 and intermediate shaft 18 that are arranged in parallel with each other and is housed in a CVT case 10a together with the differential mechanism D. The input shaft 14 is coupled or connected to the engine 12, more specifically to an output shaft (crankshaft) 12b of the engine 12 through a coupling mechanism CP. The input shaft 14 is disposed with a drive pulley 20 of the CVT 10.

The drive pulley 20 has a fixed drive pulley-half 20a installed on the input shaft 14 to be irrotatable relative thereto and immovable in the longitudinal direction of the shaft 14, and a movable drive pulley-half 20b installed to be irrotatable relative to the input shaft 14 but movable in the longitudinal direction of the shaft 14 relative to the fixed drive pulley-half 20a. A drive pulley width regulating mechanism 22 that regulates a pulley width of the drive pulley 20 (i.e., lateral pressure) in response to hydraulic pressure (pressure of supplied operating oil) is installed at the side of the movable drive pulley-half 20b.

The drive pulley width regulating mechanism 22 has a cylinder wall 22a installed at the side of the movable drive pulley-half 20b, a cylinder chamber 22b formed between the cylinder wall 22a and the movable drive pulley-half 20b, and a return spring 22c installed in the cylinder chamber 22b to urge the movable drive pulley-half 20b toward the fixed drive pulley-half 20a.

When the hydraulic pressure in the cylinder chamber 22b is increased, the movable drive pulley-half 20b approaches the fixed drive pulley-half 20a so that the pulley width of the drive pulley 20 is narrowed (lateral pressure is increased), and when the pressure of the operating oil is decreased, the movable drive pulley-half 20b is made away from the fixed drive pulley-half 20a so that the pulley width is widen (lateral pressure is decreased).

The output shaft 16 is disposed with a driven pulley 24. The driven pulley 24 has a fixed driven pulley-half 24a installed on the output shaft 16 to be irrotatable relative thereto and immovable in the longitudinal direction of the shaft 16, and a movable driven pulley-half 24b installed to be irrotatable relative to the output shaft 16 but movable in the longitudinal direction of the shaft 16 relative to the fixed drive pulley-half 24a. A driven pulley width regulating mechanism 26 that regulates a pulley width (lateral pressure) of the driven pulley 24 in response to pressure of supplied operating oil is installed at the side of the movable driven pulley-half 24b.

The driven pulley width regulating mechanism 26 has a cylinder wall 26a installed at the side of the movable driven pulley-half 24b, a cylinder chamber 26b formed between the cylinder wall 26a and the movable driven pulley-half 24b, and a return spring 26c installed in the cylinder chamber 26b to urge the movable driven pulley-half 24b toward the fixed driven pulley-half 24a.

When the hydraulic pressure in the cylinder chamber 26b is increased, the movable driven pulley-half 24b approaches the fixed driven pulley-half 24a so that the pulley width of the driven pulley 24 is narrowed (lateral pressure is increased), and when pressure of the operating oil is decreased, the movable driven pulley-half 24b is made away from the fixed driven pulley-half 24a so that the pulley width is widen (lateral pressure is decreased).

A metal V-shaped belt (power transmission element) 30 is wound around the drive pulley 20 and driven pulley 24. The belt 30 has a number of elements that are connected by ring-shape members (not shown). V-shape surfaces formed on the each element contact with pulley surfaces of the drive pulley 20 and driven pulley 24, so that, as being firmly pressed laterally from both sides, the belt 30 transmits power of the engine 12 from the drive pulley 20 to the driven pulley 24.

A planetary gear mechanism 32 is provided on the input shaft 14. The planetary gear mechanism 32 has a sun gear 34 spline-fitted to the input shaft 14 to be rotated integrally therewith, a ring gear 36 formed integrally with the fixed drive pulley-half 20a, a planetary carrier 40 installed to be rotatable relative to the input shaft 14, and a plurality of planetary gears 42 rotatably supported by the planetary carrier 40.

Each of the planetary gears 42 is always in mesh with both of the sun gear 34 and ring gear 36. An FWD (forward) clutch 44 is installed between the sun gear 34 and ring gear 36 and a RVS (reverse) brake clutch 46 is installed between the planetary carrier 40 and case 10a.

The FWD clutch 44 engages a friction plate on the sun gear 34 side with a friction plate on the ring gear 36 side to couple the sun gear 34 to the ring gear 36, i.e., is engaged (brought to the in-gear position) to make the vehicle 1 to move forward, when the operating oil is supplied to its cylinder chamber 44a and a clutch piston 44b is displaced leftward in FIG. 1 against spring force of a return spring 44c.

The RVS brake clutch 46 engages a friction plate on the case 10a side with a friction plate on the planetary carrier 40 side to couple the case 10a to the planetary carrier 40, i.e., is engaged (brought to the in-gear position) to make the vehicle 1 to move backward (in reverse), when operating oil is supplied to a cylinder chamber 46a so that a brake piston 46b is displaced leftward in FIG. 1 against spring force of a return spring 46c.

The output shaft 16 is provided with an intermediate shaft drive gear 50 and a start clutch (the aforesaid clutch) 52. The start clutch 52 engages a friction plate on the output shaft 16 side with a friction plate on the intermediate shaft drive gear 50 side to couple the output shaft 16 to the intermediate shaft drive gear 50, when operating oil is supplied to a cylinder chamber 52a so that a clutch piston 52b is displaced against spring force of a return spring 52c.

The intermediate shaft 18 is provided with an intermediate shaft driven gear 54 and a DF (differential) drive gear 56. The gear 54 and DF drive gear 56 are both fixed on the intermediate shaft 18, and the intermediate shaft driven gear 54 is always in mesh with the intermediate shaft drive gear 50. The DF drive gear 56 is always in mesh with a DF driven gear 58 that is fixed at a case Dc.

The differential mechanism D is fastened with left and right drive shafts 60, and the ends of the shafts 60 are attached with left and right driven wheels WL, WR, respectively. The DF driven gear 60 is always in mesh with the DF drive gear 56 so that the entire differential case Dc is rotated about the drive shafts 60 with the rotation of the intermediate shaft 18.

Under a condition where lateral pressure capable of preventing slippage of the belt 30 is applied to the cylinder chamber 22b of the drive pulley 20 and the cylinder chamber 26b of the driven pulley 24 by controlling pressures of the operating oil to be supplied to the cylinder chambers 22b, 26b of the pulleys, when rotation of the engine 12 is inputted to the input shaft 14, the inputted rotation is transmitted from the input shaft 14, through the drive pulley 20, belt 30 and driven pulley 24 and then to the output shaft 16.

At this time, a continuous or stepless gear ratio can be achieved as desired in accordance with a ratio of the winding radiuses (pulley ratio), by increasing or decreasing lateral pressure applied to the drive pulley 20 and driven pulley 24 to change the pulley widths to vary the winding radiuses of the belt 30 around the pulleys 20, 24.

The power transmission mechanism 2 comprises the aforesaid CVT 10, FWD clutch 44, RVS brake clutch 46 and start clutch 52. The pulley width between the drive and driven pulley 20, 24 and engaging/disengaging of the FWD clutch 44, RVS brake clutch 46 and start clutch 52 are conducted by controlling pressure of the operating oil (hydraulic pressure) to be supplied to their cylinder chambers 22b, 26b, 44a, 46a, 52a through a hydraulic control apparatus 62.

The hydraulic control apparatus 62 has an oil pump 62c that is driven by the engine 12 and pumps the operating oil from a reservoir 62a and discharges it to oil paths 62b, and a group of electromagnetic control valves 62d disposed at the oil paths 62b to changes the direction of flow and pressure of the operating oil.

The group of electromagnetic control valves 62d includes linear solenoid valves in normal open type that control supply of hydraulic pressure to the cylinder chambers 22b, 26b of the drive pulley width regulating mechanism 22 and driven pulley width regulating mechanism 26, shift solenoid valves that control supply of hydraulic pressure to the cylinder chambers 44a, 46a of the FWD clutch 44 and RVS brake clutch 46, and a linear solenoid valve that controls supply of hydraulic pressure to the cylinder chamber 52a of the start clutch 52.

A throttle valve (not shown) provided at the air intake system of the engine 12 has no mechanical connection with an accelerator pedal installed at a floor of the operator's seat of the vehicle, and is connected to a DBW (Drive-By-Wire) mechanism 64 to be opened/closed by its actuator (stepper motor) 64a.

Air sucked in the engine 12 is regulated by the throttle valve and flows through an intake manifold (not shown) to an intake port of each cylinder where it is mixed with fuel injected by an injector 66 to form an air-fuel mixture. The mixture is introduced into a combustion chamber (not shown) when intake valves are opened, is ignited and combusted. The resulting combustion of the mixture drives a piston downwardly to rotate the output shaft 12b of the engine 12, while the exhaust gas produced by the combustion is discharged to the exterior of the engine 12.

A crank angle sensor 68 is installed near a cam shaft (not shown) of the engine 12 or thereabout and produces an output indicative of an engine speed NE at every predetermined crank angle position of the piston. In the air intake system, a manifold absolute pressure sensor 70 is installed downstream of the throttle valve and produces an output proportional to manifold absolute pressure (engine load) PBA.

A coolant temperature sensor 72 is installed near a coolant passage (not shown) and produces an output indicative of the engine coolant temperature TW. An intake air temperature sensor 74 is installed at an appropriate position upstream of the throttle valve and produces an output indicative of the intake air temperature TA. A throttle position sensor 76 is installed at a position near the stepper motor 64a of the DBW mechanism 64 and produces an output indicative of throttle opening (position) TH.

An oil temperature sensor 78 is installed at a location in the reservoir 62a, for example, and produces an output indicative of the temperature of the operating oil (ATF) to be supplied to the CVT 10.

In the CVT 10, an NDR sensor 80 is installed at an appropriate position near the drive pulley 20 and produces a pulse signal corresponding to a rotational speed of the drive pulley 20, i.e., an input rotational speed NDR of the CVT, while an NDN sensor 82 is installed at an appropriate position near the driven pulley 24 to produce a pulse signal corresponding to a rotational speed of the driven pulley 24, i.e., an output rotational speed NDN of the CVT 10.

A vehicle speed sensor 84 is installed near the drive shaft 60 and produces a pulse signal indicative of the vehicle speed (running speed of the vehicle) V or a rotational speed of the intermediate shaft 18 (i.e., output rotational speed of the start clutch 52).

The NDR sensor 80, NDN sensor 82 and vehicle speed sensor 84 comprise magneto-electric transducers like magnetic pickups that produce a plurality of pulse signals per revolution in response to intersection with magnetic field formed by a plurality of magnetic projections installed around the drive/driven pulleys 20, 24 and intermediate shaft 18.

An accelerator position sensor 86 is installed near an accelerator pedal provided at the operator's seat of the vehicle and produces a signal proportional to an accelerator position or opening AP corresponding to an amount of operator's accelerator pedal manipulation.

The outputs of the above-mentioned sensors including the crank angle sensor 68 are sent to an ECU (Electronic Control Unit) 90. The ECU 90 has a microcomputer 90a and the outputs of the aforesaid sensors are inputted to the microcomputer 90a. In the ECU 90, the microcomputer 90a controls operation of the engine 12 based on the sensor outputs, and controls operation of the CVT 10, FWD clutch 44, RVS brake clutch 46 and start clutch 52 by regulating the engaging force through supply/discharge of the operating oil.

As stated, the embodiment is configured to have the engine (drive source) 12 mounted on the vehicle 1, the power transmission mechanism 2 comprising the CVT 10 equipped with at least the input shaft 14 connected to the engine 12, the output shaft 16 connected to the input shaft 14 via a speed ratio changing mechanism such as the drive pulley 20, the driven pulley 24 and the belt 30, and the start clutch (clutch) 52 transmitting a rotation of the output shaft 16 to the driven wheels WL and WR, and the ECU (clutch engaging force regulator) 90 that regulates engaging force of the start clutch 52 of the CVT 10 through the operating oil to be supplied thereto, and to transmit the driving force outputted from the engine 12 to the driven wheels WL, WR through the start clutch (hereinafter simply referred to as "clutch") 52 whose engaging force is regulated by the ECU 90.

Figure 2:
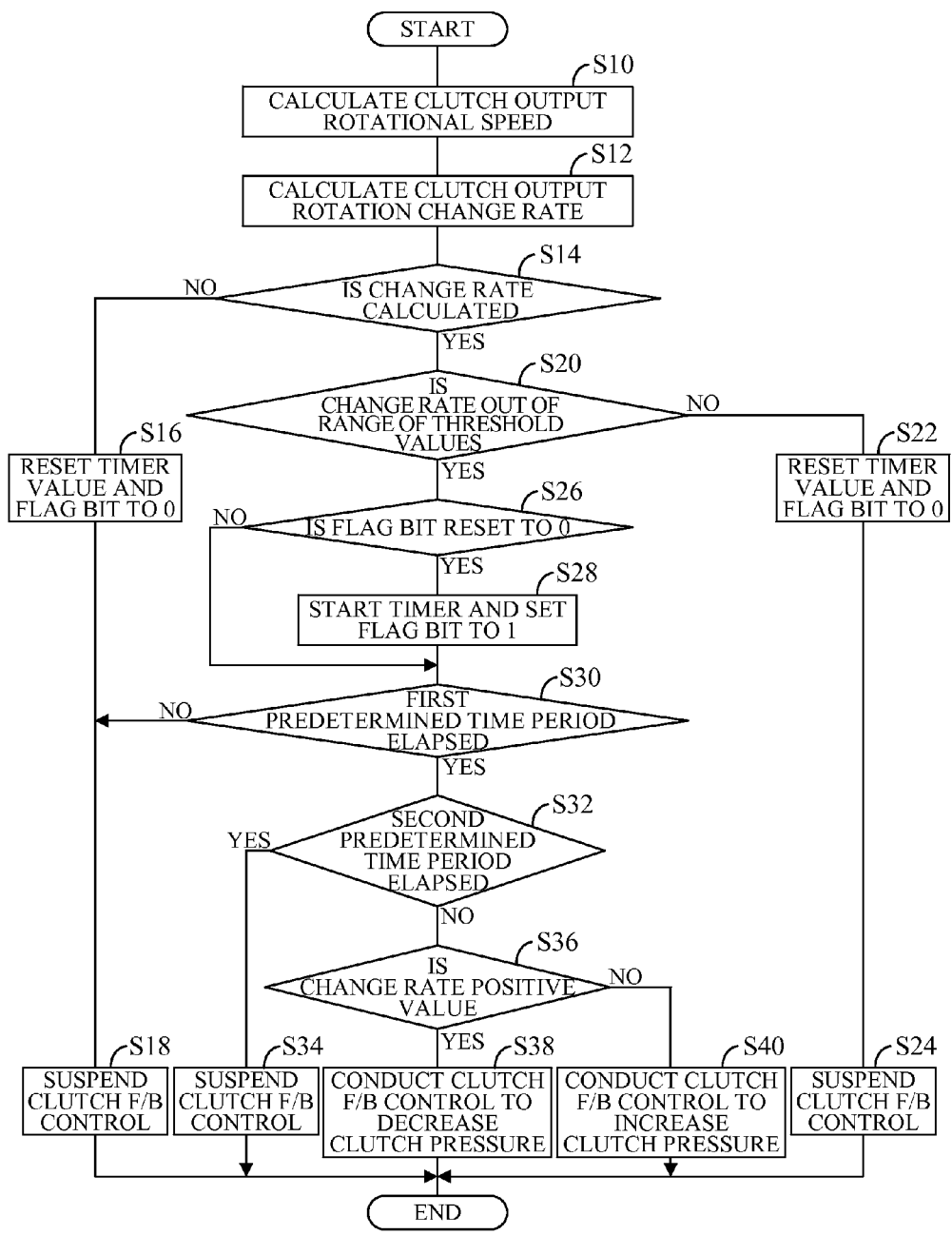
FIG. 2 is a flowchart showing an operation of the apparatus shown in FIG. 1.

FIG. 2 is a flowchart showing operation of the aforesaid apparatus, more specifically the operation of the ECU 90.

Explaining this, the program begins at S10, in which a clutch output rotational speed (output rotational speed of the clutch 52, more correctly the rotational speed of the intermediate shaft 18) is calculated. Here, "S" indicates processing step in the flowchart of FIG. 2. The calculation of the clutch output rotational speed is conducted by measuring time intervals between pulse signals outputted from the vehicle speed sensor 84.

Figure 3:
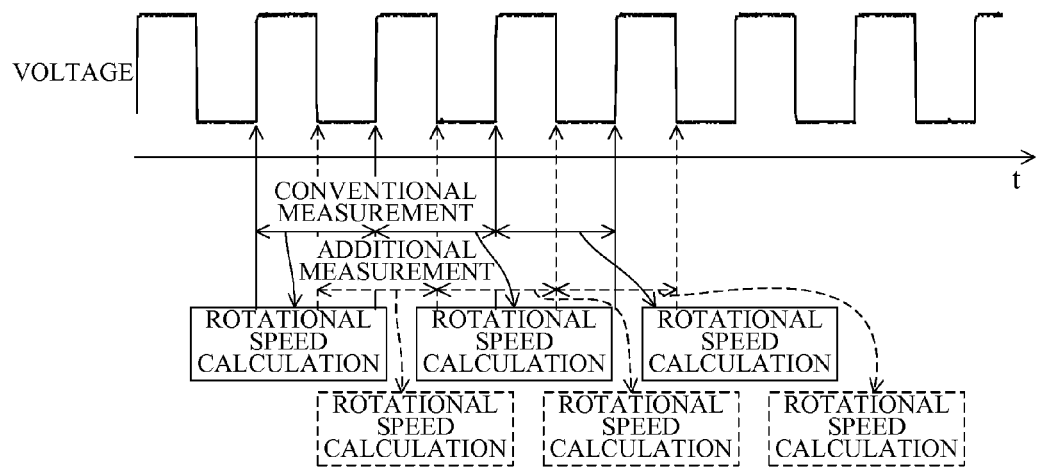
FIG. 3 is an explanatory view showing pulse signals outputted from a vehicle speed sensor installed in the apparatus shown in FIG. 1.

FIG. 3 is an explanatory view showing the pulse signal outputted from the vehicle speed sensor 84. In this kind of measurement, time intervals between rising edges of the pulse train have been conventionally used. In the embodiment, in addition thereto, time intervals between falling edges of the pulse train are also used to calculate the clutch output rotational speed.

Figure 4:
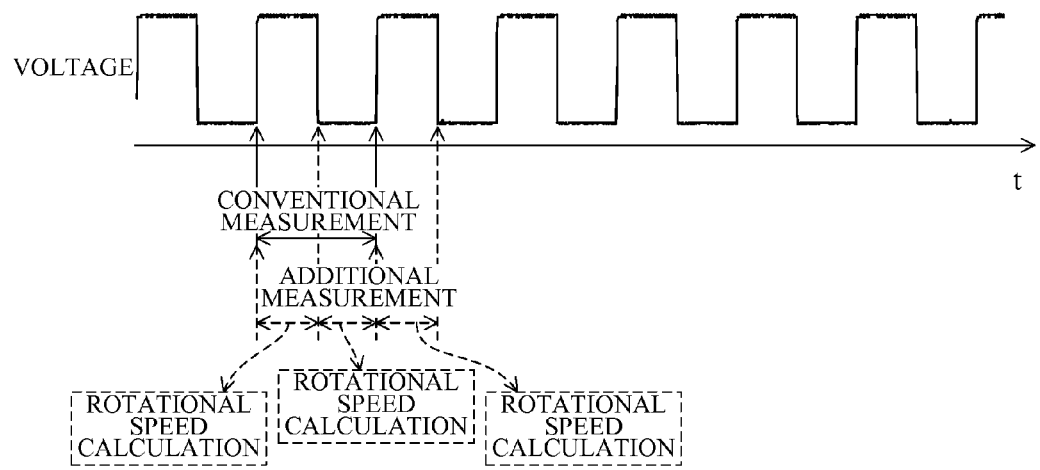
FIG. 4 is an explanatory view similarly showing pulse signals outputted from a vehicle speed sensor installed in the apparatus shown in FIG. 1.

Moreover, instead of the measurement shown in FIG. 3, the clutch output rotational speed may be calculated using time intervals between the rising edges of the pulse train and those between the rising and falling edges of the pulse train as shown in FIG. 4.

In the flowchart of FIG. 2, the program then proceeds to S12, in which a clutch output rotation change rate (change rate of the output rotation of the clutch 52) is calculated. The clutch output rotation change rate is calculated by obtaining a differential value of the clutch output rotational speed calculated in S10.

Figure 5:
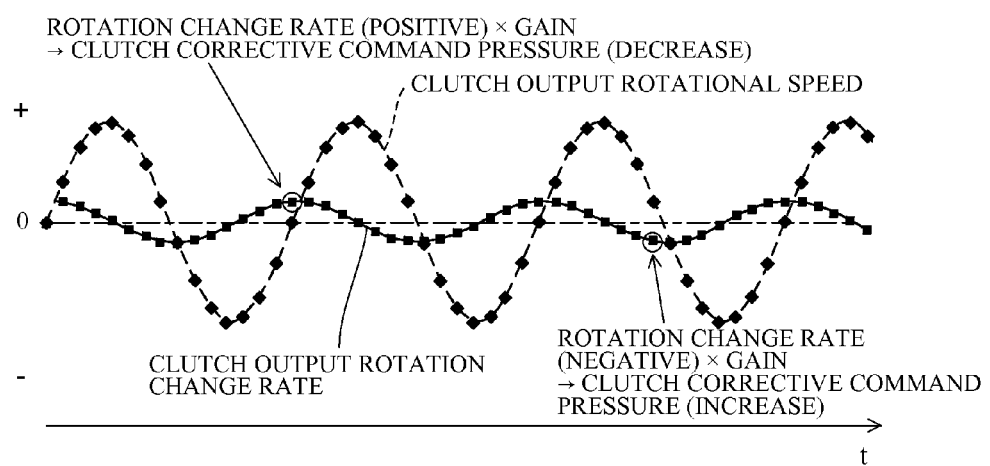
FIG. 5 is an explanatory view showing a clutch output rotational speed and clutch output rotation change rate calculated in processing of the FIG. 2 flowchart.

The clutch output rotational speed and clutch output rotation change rate are shown in FIG. 5. It should be noted that, noise may enter in the sensor outputs and detection accuracy may be degraded, when the rotational speed of the intermediate shaft 18 (indicative of the vehicle speed V) is quite low. Accordingly, in the processing at S12, the rotational speed of the intermediate shaft 18 is compared with a predetermined value and if the rotational speed is less than the predetermined value, the calculation of the clutch output rotation change rate is suspended.

Returning to the explanation of the flowchart of FIG. 2, the program next proceeds to S14, in which it is determined whether the clutch output rotation change rate is calculated, in other words it is determined whether the rotational speed of the intermediate shaft 18 is equal to or greater than the predetermined value. When the result is negative, the program proceeds to S16, in which the value of a timer (timer counter explained later) is reset to 0 and the bit of a flag F is reset to 0.

The program then proceeds to S18, in which clutch F/B (feedback) control is suspended. The clutch F/B control means processing to correct the clutch engaging force (clutch pressure) to decrease when the calculated clutch output rotation change rate is a positive value, or to correct the clutch engaging force to increase when the calculated rate is a negative value.

Specifically, this processing is conducted, as shown in FIG. 5, by multiplying the clutch output rotation change rate by a gain (proportional gain) in accordance with positive/negative of the change rate and by making the resultant product as a clutch corrective command pressure (amount of the decrease correction or increase correction).

Figure 6:
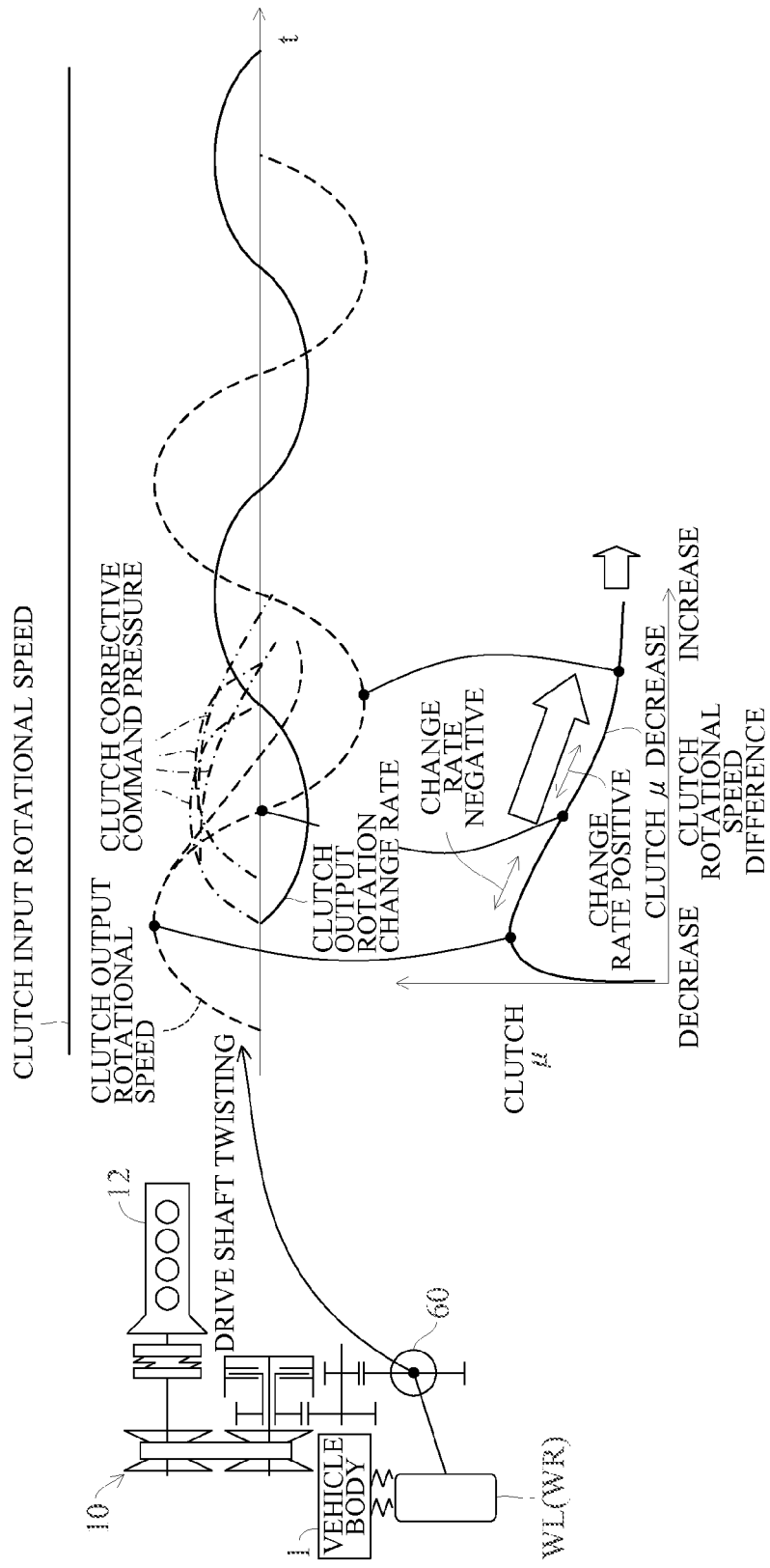
FIG. 6 is an explanatory view showing the processing of the FIG. 2 flowchart.

FIG. 6 is a time chart showing the operation of the apparatus according to the embodiment.

Briefing the operation of the apparatus according to the embodiment before continuing the explanation of the FIG. 2 flowchart, juddering may occur in the clutch 52 due to the difference between input and output rotational speeds, rendering the occupant to have uncomfortable feeling, as mentioned above. The juddering becomes remarkable as the deterioration of the clutch 52 progresses. In the embodiment, the output rotation speed of the clutch 52 is assumed to indicate the difference between input and output rotational speeds of the clutch 52.

As shown, juddering of the clutch 52 may also be increased by twisting of the drive shaft 60 on which the vehicle speed sensor 84 is installed. Moreover, the clutch juddering is affected by frictional coefficient of the clutch 52 (frictional coefficient of the clutch friction plate) $\mu$. Thus, the juddering occurs when the difference between the input and output rotational speeds of the clutch 52 increases while the frictional coefficient $\mu$ decreases.

Accordingly, the embodiment is configured to calculate the clutch output rotation change rate from the clutch output rotational speeds and to calculate the clutch corrective command pressure to correct the clutch engaging force to decrease when the calculated change rate is a positive value since the difference between the input and output rotational speeds of the clutch 52 becomes small and the frictional coefficient $\mu$ becomes great, and to calculate the clutch corrective command pressure to correct the clutch engaging force to increase when the calculated change rate is a negative value since the difference between the input and output rotational speeds of the clutch 52 becomes great and the friction coefficient $\mu$ becomes small.

Figure 7:
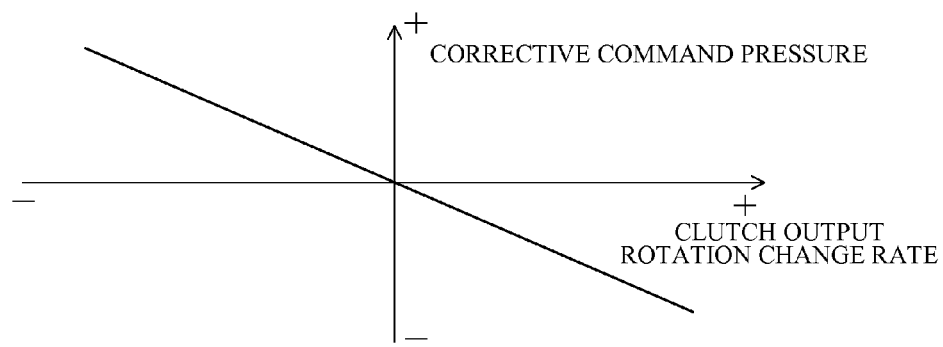
FIG. 7 is an explanatory view showing characteristics of the clutch corrective command pressure relative to the clutch output rotation change rate calculated in the processing of the FIG. 2 flowchart.

FIG. 7 is an explanatory view showing characteristics of the clutch corrective command pressure relative to the clutch output rotation change rate.

As shown, the clutch corrective command pressure is calculated to be increased with increasing clutch output rotation change rate whichever the command pressure may be the decrease correction or increase correction. To be more specific, the clutch corrective command pressure is calculated in such a manner that the amount of the decrease correction or increase correction is increased as the clutch output rotation change rate increases in absolute value.

As mentioned above with reference to FIG. 5, the clutch corrective command pressure is calculated by multiplying the clutch output rotation change rate by the gain. It should be noted that the gain itself is to be replaced depending on whether the change rate is negative or positive.

Returning to the explanation of the FIG. 2 flowchart, when the determination in S14 is affirmative and it is determined that the clutch output rotation change rate is calculated, the program proceeds to S20, in which it is determined whether the calculated clutch output rotation change rate is out of a range of threshold values (predetermined range).

Figure 8:
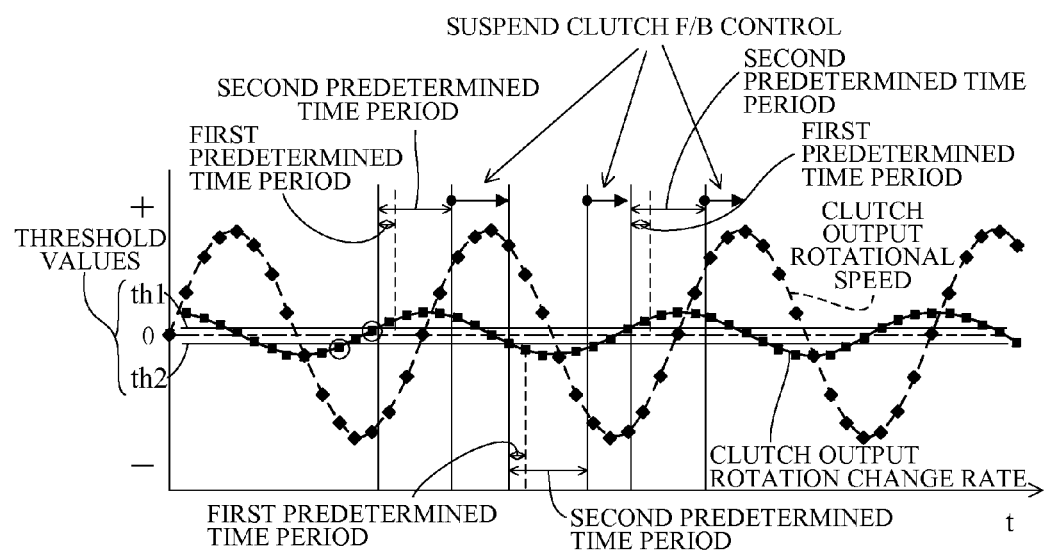
FIG. 8 is an explanatory view, similar to FIG. 5, but showing first and second predetermined time periods used in the processing of the FIG. 2 flowchart.

FIG. 8 shows the range of threshold values. As shown, when centering at zero of the clutch output rotation change rate, the threshold values are set to be slight positive and negative (upper and lower) values th1, th2 from zero. The range of threshold values means a range defined by the upper and lower threshold values th1, th2.

In the FIG. 2 flowchart, when the result at S20 is negative and it is determined that the calculated clutch output rotation change rate is not out of the range of threshold values (predetermined range), i.e., it is within the range of threshold values, the program proceeds to S22, in which the value of the timer is reset to 0 and the bit of the flag F is reset to 0, and proceeds to S24, in which the clutch F/B control is suspended.

On the other hand, when the result at S20 is affirmative and it is determined that the clutch output rotation change rate is out of the range of threshold values (out of the predetermined range), the program proceeds to S26 and on to conduct the clutch F/B control if conditions explained later are met.

The reason why the determination at S20 is interposed is to conduct necessary correction surely, while avoiding unnecessary correction. To be more specific, juddering of the clutch 52 becomes different depending on the temperature (oil temperature) TATF of the operating oil ATF supplied to the clutch 52 and on the rotational speed of the output shaft 16 (vehicle speed V).

Therefore, the range of threshold values should be set or changed based on the oil temperature and vehicle speed, in other words based on at least the oil temperature in such a manner that it is narrow in a region where the juddering is likely to occur so that the clutch F/B control is likely to be conducted, while it is wide in a region where the juddering is less likely to occur so that the clutch F/B control is likely to be suspended, i.e., unnecessary conduction of the control is likely to be avoided.

In other words, by setting the range of threshold values depending on a situation whether it is in a region where the juddering of the clutch 52 is likely to occur or not, it becomes possible to make the range narrow in a region where the juddering is likely to occur such that the correction is likely to be conducted for juddering at a level equal to or greater than a predetermined level, while it becomes possible to make the range wide in a region where the juddering is less likely to occur such that the correction is less likely to be conducted, thereby enabling to avoid unnecessary correction, but to conduct necessary correction surely.

Moreover, since it is configured such that the range of threshold values are varied by the oil temperature and vehicle speed, more specifically by at least the temperature of the operating oil supplied to the clutch 52, it becomes possible to avoid unnecessary correction more surely, but to conduct necessary correction more surely.

Returning to the explanation of FIG. 2 flowchart, when the result in S20 is affirmative, the program proceeds to S26, in which it is determined whether the bit of the flag F is reset to 0, and when the result is affirmative, the program proceeds to S28, in which the aforesaid timer is started to initiate time measurement. On the contrary, when the result at S26 is negative, the program skips S28.

The program next proceeds to S30, in which it is determined whether a first predetermined time period has elapsed, more specifically it is determined whether the first predetermined time period has elapsed since the clutch output rotation change rate was determined to be out of the range of threshold values. FIG. 8 shows the first predetermined time period.

When the result at S30 is negative, the program proceeds to S18, but when the result at S30 is affirmative, the program proceeds to S32, in which it is determined whether a second predetermined time period has elapsed, more specifically, it is determined whether the second predetermined time period has elapsed since the clutch output rotation change rate was determined to be out of the range of threshold values. FIG. 8 shows the second predetermined time period. The second predetermined time period is set to be longer (greater) than the first predetermined time period.

When the result at S32 is affirmative and it is determined that the second predetermined time period has elapsed since the clutch output rotation change rate was determined to be out of the range of threshold values, the program proceeds to S34, in which the clutch F/B control is suspended. On the other hand, when the result at S32 is negative, the program proceeds to S36, in which it is determined whether the clutch output rotation change rate is a positive value or not.

When the result at S36 is affirmative and the clutch output rotation change rate is determined to be the positive value, the program proceeds to S38, in which the clutch F/B control is conducted to correct the clutch pressure (oil pressure supplied to the clutch 52) regulated by the ECU 90 to decrease, and when the result at S36 is negative and the clutch output rotation change rate is determined to be a negative value, the program proceeds to S40, in which the clutch F/B control is conducted to correct the clutch pressure regulated by the ECU 90 to increase.

As mentioned above, the clutch F/B control is conducted by outputting the clutch corrective command pressure (obtained by multiplying the clutch output rotation change rate by the gain) in such a manner that the command pressure becomes inverse to the positive/negative of the change rate in phase.

This will be explained with reference to FIG. 8.

As illustrated, the clutch output rotation change rate repeatedly inverts from the positive value to the negative value or from the negative value to the positive value. Accordingly, if the clutch output rotation change rate is determined to be out of the range of threshold values, it means that the clutch output rotation change rate inverts from the positive to the negative or from the negative to the positive and then exceeds one of the upper and lower threshold value th1, th2 upwardly or downwardly.

Here, the reason why the clutch F/B control is suspended until the first predetermined time period has elapsed since the clutch output rotation change rate inverted from the positive value to the negative value or from the negative value to the positive value and exceeded one of the upper and lower threshold values th1, th2, is to avoid unnecessary correction due to noise.

In other words, since the clutch output rotation change rate repeatedly inverts between the positive value and the negative value, execution of the clutch F/B control is limited to a situation where the clutch output rotation change rate exceeds the range of threshold values successively, thereby enabling to avoid unnecessary correction due to noise.

Moreover, the reason why the clutch F/B control is suspended after the second predetermined time period (set to be longer than the first predetermined time period) has elapsed since the clutch output rotation change rate inverted from the positive value to the negative value or from the negative value to the positive value and exceeded one of the upper and lower threshold values th1, th2, is to prevent the juddering from growing unintentionally by the execution of the clutch F/B control due to response delay of the operating oil.

For that reason, since the second predetermined time period should be determined taking response delay in the operating oil into account, it is set to be necessarily longer than the first predetermined time period, and is set to be variable according to response characteristics of the operating oil such as the temperature of the operating oil.

It should be noted that, although the difference between the input and output rotational speeds of the clutch 52 is expressed by the output rotational speed detected from the outputs of the vehicle speed sensor 84, it is alternatively possible to directly calculate the difference between the input and output rotational speeds of the clutch 52 by using the input rotational speed of the clutch 52 detected from the outputs of the NDN sensor 82 and the output rotational speed of the clutch 52 detected from the outputs of the vehicle speed sensor 84.

As stated above, the embodiment is configured to have an apparatus for controlling a vehicle power transmission mechanism (2) having a drive source (engine) (12) mounted on a vehicle (1), a transmission (CVT 10) equipped with at least an input shaft (14) connected to the drive source, an output shaft (16) connected to the input shaft via a speed ratio changing mechanism (a drive pulley (20), a driven pulley (24) and a belt (30)), and a clutch (start clutch)(52) transmitting a rotation of the output shaft 16 to driven wheels (WL, WR), and a clutch engaging force regulator (ECU 90) that regulates engaging force of the clutch of the mechanism (2), and transmitting driving force outputted from the drive source to the driven wheels (WL, WR) through the clutch (52) whose engaging force is regulated by the clutch engaging force regulator, comprising: a clutch output rotation change rate calculator (ECU 90, S10, S12) that calculates an output rotation change rate of the clutch based on a differential value of a rotational speed of a clutch output shaft (intermediate shaft 18); and a clutch engaging force corrector (ECU 90, S14-S40) that corrects the clutch engaging force regulated by the clutch engaging force regulator to decrease when the calculated output rotation change rate of the clutch is a positive value, and corrects the clutch engaging force to increase when the calculated output rotation change rate of the clutch is a negative value. With this, it becomes possible to detect juddering of the clutch from the clutch output rotation change rate, and to maintain the difference in the input and output rotational speeds of the clutch to a proper value by correcting the clutch engaging force to decrease when the output rotation change rate corresponding to the output rotation change rate of the clutch is a positive value (i.e., the difference in the input and output rotational speeds of the clutch 52 decreases), and by correcting the clutch engaging force to increase when the output rotation change rate of the clutch is a negative value (i.e., the difference in the input and output rotational speeds of the clutch 52 increases), thereby enabling to suppress the juddering of the clutch 52 effectively. It can be understood that, insofar as the configuration mentioned here, the clutch 52 should not be limited to the hydraulic clutch.

Further, the apparatus is configured such that, the clutch engaging force corrector increases an amount of the decrease correction or increase correction of the clutch engaging force as an absolute value of the calculated output rotation change rate of the clutch increases (ECU 90, S36-S40). With this, in addition to the effects and advantages mentioned above, it becomes possible to maintain the difference in the input and output rotational speeds of the clutch 52 to a more proper value.

Further, the apparatus is configured such that the clutch engaging force corrector suspends the decrease correction or increase correction of the clutch engaging force until a first predetermined time period elapses since the calculated output rotation change rate of the clutch inverted from the positive value to the negative value or from the negative value to the positive value (ECU 90, S20, S26-S30, S18). With this, in addition to the effects and advantages mentioned above, it becomes possible to avoid unnecessary correction due to noise.

Further, the apparatus is configured such that the clutch engaging force corrector corrects the clutch engaging force through an operating oil to be supplied to the clutch, and suspends the decrease correction or increase correction of the clutch engaging force after a second predetermined time period, that is set to be longer than the first predetermined time period, has elapsed since the calculated output rotation change rate of the clutch inverted from the positive value to the negative value or from the negative value to the positive value (ECU 90, S20, S26-S34). With this, in addition to the effects and advantages mentioned above, it becomes possible to prevent the juddering of the clutch 52 from increasing unintentionally by the correction due to response delay of the operating oil.

Further, the apparatus is configured such that the clutch engaging force corrector includes: a rotation change rate range discriminator (ECU 90, S20) that discriminates whether the calculated output rotation change rate of the clutch is within a predetermined range; and suspends the decrease correction or increase correction of the clutch engaging force when it is discriminated by the rotational change rate range discriminator that the calculated output rotation change rate of the clutch is within the predetermined range (range of threshold values; ECU 90, S22-S24). With this, in addition to the effects and advantages mentioned above, it becomes possible to conduct necessary correction surely, while avoiding unnecessary correction. Specifically, by setting the predetermined range depending on a situation whether it is in a region where the juddering of the clutch 52 is likely to occur or not, it becomes possible to make the range narrow in a region where the juddering is likely to occur such that the correction is likely to be conducted for juddering at a level equal to or greater than a predetermined level, while making the range wide in a region where the juddering is less likely to occur such that the correction is less likely to be conducted, thereby enabling to avoid unnecessary correction, but to conduct necessary correction surely.

Further, the apparatus is configured such that the clutch engaging force corrector corrects the clutch engaging force through an operating oil to be supplied to the clutch, and the predetermined range is varied in accordance with at least a temperature of the operating oil to be supplied to the clutch 52. With this, in addition to the effects and advantages mentioned above, it becomes possible to conduct necessary correction more surely, while avoiding unnecessary correction more surely.

Further, the apparatus is configured such that the clutch engaging force corrector calculates an amount of the decrease correction or increase correction of the clutch engaging force (clutch corrective command pressure) by multiplying the calculated output rotation change rate by a gain. With this, in addition to the effects and advantages mentioned above, it becomes possible to calculate the amount of correction properly.

It should also be noted that, although the engine is exemplified as an example of the drive source, the invention is not limited thereto and it may be an electric motor or a hybrid of the electric motor and engine.

It should further be noted that, although the configuration having the automatic transmission (CVT) with gear shift function as an example of the power transmission unit, the invention is not limited thereto.

INDUSTRIAL APPLICABILITY

According to this invention, in a control apparatus for a vehicle power transmission mechanism having a transmission equipped with at least an input shaft connected to a drive source mounted on a vehicle, an output shaft connected to the input shaft via a speed ratio changing mechanism, and a clutch transmitting a rotation of the output shaft to driven wheels, a clutch output rotation change rate is calculated, and the engaging force of the clutch is corrected to decrease when the calculated output rotation change rate is a positive value, and the clutch engaging force is corrected to increase when the calculated output rotation change rate is a negative value, thereby enabling to suppress clutch juddering occurring due to a difference between input and output rotational speeds of the clutch.

DESCRIPTION OF SYMBOLS

1 Vehicle, 2 Power transmission mechanism, 10 CVT (Continuously Variable Transmission), 12 Engine (drive source), 14 Input shaft, 16 Output shaft, 18 Intermediate shaft, 20 Drive pulley, 22 Drive pulley width regulating mechanism, 24 Driven pulley, 26 Driven pulley width regulating mechanism, 30 Belt (power transmission element), 44 FWD clutch, 46 RVS brake clutch, 52 Start clutch, 52a Cylinder chamber, 60 Drive shaft, 62 Hydraulic pressure control apparatus, 62d Electromagnetic control valves, 64 DBW mechanism, 68 Crank angle sensor, 70 Manifold absolute pressure sensor, 72 Coolant temperature sensor, 74 Intake air temperature sensor, 76 Throttle position sensor, 78 Oil temperature sensor, 80 NDR sensor, 82 NDN sensor, 84 Vehicle speed sensor, 86 Accelerator position sensor, 90 ECU (Electronic control unit), WL, WR Driven wheels

The invention claimed is:

1. An apparatus for controlling a vehicle power transmission mechanism having a drive source mounted on a vehicle, a transmission equipped with at least an input shaft connected to the drive source, an output shaft connected to the input shaft via a speed ratio changing mechanism, and a clutch transmitting a rotation of the output shaft to driven wheels, and a clutch engaging force regulator that regulates engaging force of the clutch of the transmission, the vehicle power transmission mechanism being configured to transmit driving force outputted from the drive source to the driven wheels through the input shaft, the output shaft, and the clutch whose engaging force is regulated by the clutch engaging force regulator, comprising:

a clutch output rotation change rate calculator that calculates an output rotation change rate of the clutch based on a differential value of a rotational speed of an output shaft of the clutch; and a clutch engaging force corrector that corrects the clutch engaging force regulated by the clutch engaging force regulator to decrease when the calculated output rotation change rate of the clutch is a positive value, and corrects the clutch engaging force to increase when the calculated output rotation change rate of the clutch is a negative value.

2. The apparatus according to claim 1, wherein the clutch engaging force corrector increases an amount of the decrease correction or increase correction of the clutch engaging force as an absolute value of the calculated output rotation change rate of the clutch increases.

3. The apparatus according to claim 1, wherein the clutch engaging force corrector suspends the decrease correction or increase correction of the clutch engaging force until a first predetermined time period elapses since the calculated output rotation change rate of the clutch inverted from the positive value to the negative value or from the negative value to the positive value.

4. The apparatus according to claim 3, wherein the clutch engaging force corrector corrects the clutch engaging force through an operating oil to be supplied to the clutch, and suspends the decrease correction or increase correction of the clutch engaging force after a second predetermined time period that is set to be longer than the first predetermined time period has elapsed since the calculated output rotation change rate of the clutch inverted from the positive value to the negative value or from the negative value to the positive value.

5. The apparatus according to claim 4, wherein the second predetermined time period is set to be variable according to a temperature of the operating oil supplied to the clutch.

6. The apparatus according to claim 1, wherein the clutch engaging force corrector includes:

a rotation change rate range discriminator that discriminates whether the calculated output rotation change rate of the clutch is within a predetermined range;

and suspends the decrease correction or increase correction of the clutch engaging force when it is discriminated by the rotational change rate range discriminator that the calculated output rotation change rate of the clutch is within the predetermined range.

7. The apparatus according to claim 6, wherein the clutch engaging force corrector corrects the clutch engaging force through an operating oil to be supplied to the clutch, and the predetermined range is varied in accordance with a temperature of the operating oil to be supplied to the clutch.

8. The apparatus according to claim 7, wherein the predetermined range is varied based on a temperature of the operating oil supplied to the clutch and a rotational speed of the output of the clutch.

9. The apparatus according to claim 1, wherein the clutch engaging force corrector calculates an amount of the decrease correction or increase correction of the clutch engaging force by multiplying the calculated output rotation change rate of the clutch by a gain.

10. A method for controlling a vehicle power transmission mechanism having a drive source mounted on a vehicle, a transmission equipped with at least an input shaft connected to the drive source, an output shaft connected to the input shaft via a speed ratio changing mechanism, and a clutch transmitting a rotation of the output shaft to driven wheels, and a clutch engaging force regulator that regulates engaging force of the clutch of the transmission, the vehicle power transmission mechanism being configured to transmit driving force outputted from the drive source to the driven wheels through the input shaft, the output shaft, and the clutch whose engaging force is regulated by the clutch engaging force regulator, comprising the steps of:

calculating an output rotation change rate of the clutch based on a differential value of a rotational speed of an output shaft of the clutch; and correcting the clutch engaging force regulated by the clutch engaging force regulator to decrease when the calculated output rotation change rate of the clutch is a positive value, and correcting the clutch engaging force to increase when the calculated output rotation change rate of the clutch is a negative value.

11. The method according to claim 10, wherein the step of correcting the clutch engaging force further comprises increasing an amount of the decrease correction or increase correction of the clutch engaging force as an absolute value of the calculated output rotation change rate of the clutch increases.

12. The method according to claim 10, wherein the step of correcting the clutch engaging force further comprises suspending the decrease correction or increase correction of the clutch engaging force until a first predetermined time period elapses since the calculated output rotation change rate of the clutch inverted from the positive value to the negative value or from the negative value to the positive value.

13. The method according to claim 12, wherein the step of correcting the clutch engaging force further comprises correcting the clutch engaging force through an operating oil to be supplied to the clutch, and suspends the decrease correction or increase correction of the clutch engaging force after a second predetermined time period that is set to be longer than the first predetermined time period has elapsed since the calculated output rotation change rate of the clutch inverted from the positive value to the negative value or from the negative value to the positive value.

14. The method according to claim 10, wherein the step of correcting the clutch engaging force further includes the steps of:
discriminating whether the calculated output rotation change rate of the clutch is within a predetermined range;
and suspending the decrease correction or increase correction of the clutch engaging force when it is discriminated by the step of rotational change rate range discriminating that the calculated output rotation change rate of the clutch is within the predetermined range.

15. The method according to claim 10, wherein the step of correcting the clutch engaging force further comprises calculating an amount of the decrease correction or increase correction of the clutch engaging force by multiplying the calculated output rotation change rate of the clutch by a gain.

16. An apparatus for controlling a vehicle power transmission mechanism having a drive source mounted on a vehicle, a transmission equipped with at least an input shaft connected to the drive source, a speed ratio changing mechanism connected to the input shaft via a clutch, and an output shaft connected to the clutch via the speed ratio changing mechanism, and a clutch engaging force regulator that regulates engaging force of the clutch of the transmission, the vehicle power transmission mechanism being configured to transmit driving force outputted from the drive source to driven wheels through the clutch whose engaging force is regulated by the clutch engaging force regulator, comprising:

a clutch output rotation change rate calculator that calculates an output rotation change rate of the clutch based on a differential value of a rotational speed of an output shaft of the clutch; and
a clutch engaging force corrector that corrects the clutch engaging force regulated by the clutch engaging force regulator to decrease when the calculated output rotation change rate of the clutch is a positive value, and corrects the clutch engaging force to increase when the calculated output rotation change rate of the clutch is a negative value.

17. The apparatus according to claim 16, wherein the clutch engaging force corrector increases an amount of the decrease correction or increase correction of the clutch engaging force as an absolute value of the calculated output rotation change rate of the clutch increases.

18. The apparatus according to claim 16, wherein the clutch engaging force corrector suspends the decrease correction or increase correction of the clutch engaging force until a first predetermined time period elapses since the calculated output rotation change rate of the clutch inverted from the positive value to the negative value or from the negative value to the positive value.

19. The apparatus according to claim 16, wherein the clutch engaging force corrector includes:
a rotation change rate range discriminator that discriminates whether the calculated output rotation change rate of the clutch is within a predetermined range;
and suspends the decrease correction or increase correction of the clutch engaging force when it is discriminated by the rotational change rate range discriminator that the calculated output rotation change rate of the clutch is within the predetermined range.

20. The apparatus according to claim 16, wherein the clutch engaging force corrector calculates an amount of the decrease correction or increase correction of the clutch engaging force by multiplying the calculated output rotation change rate of the clutch by a gain.

* * * * *